(12) United States Patent
Rao et al.

(10) Patent No.: US 6,738,983 B1
(45) Date of Patent: *May 18, 2004

(54) VIDEO PEDESTAL NETWORK

(75) Inventors: R. Padmanabha Rao, Milpitas, CA (US); Paolo L. Siccardo, Los Altos, CA (US); Gilbert Levesque, Mountain View, CA (US); Martin D. Elsbach, Boulder, CO (US)

(73) Assignee: Irdeto Access, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/843,940

(22) Filed: Apr. 17, 1997

Related U.S. Application Data

(62) Division of application No. 08/451,264, filed on May 26, 1995, now Pat. No. 5,793,410.

(51) Int. Cl.[7] .......................... H04N 7/173; H04H 1/00
(52) U.S. Cl. ..................... 725/120; 725/87; 455/3.02
(58) Field of Search ................................. 725/106, 119, 725/120, 63–66, 74, 78, 82, 129, 87, 70–71, 67–68; 370/397, 353, 486; 379/90.01, 93.05, 93.06, 93.07, 93.28; 455/3.02–3.06

(56) References Cited

U.S. PATENT DOCUMENTS

| | | | |
|---|---|---|---|
| 4,533,948 A | 8/1985 | McNamara et al. | |
| 4,638,356 A | 1/1987 | Frezza | |
| 4,760,442 A | 7/1988 | O'Connell et al. | 358/86 |
| 4,995,078 A | 2/1991 | Monslow et al. | 380/10 |
| 5,029,333 A | 7/1991 | Graves et al. | 370/58.1 |
| 5,206,722 A | 4/1993 | Kwan | 358/86 |
| 5,247,347 A | 9/1993 | Litteral et al. | 358/85 |
| 5,287,539 A | 2/1994 | West, Jr. | 455/1 |
| 5,303,229 A | 4/1994 | Withers et al. | 370/58.1 |
| 5,341,474 A | 8/1994 | Gelman et al. | 395/200 |
| 5,349,457 A | 9/1994 | Bears | 359/118 |
| 5,371,532 A | 12/1994 | Gelman et al. | 348/7 |
| 5,387,927 A | 2/1995 | Look et al. | 348/6 |
| 5,394,559 A | 2/1995 | Hemmie et al. | 455/5.1 |
| 5,396,546 A | 3/1995 | Remillard | 379/96 |
| 5,404,393 A | 4/1995 | Remillard | 379/96 |
| 5,408,260 A | 4/1995 | Arnon | 348/6 |
| 5,410,343 A | 4/1995 | Coddington et al. | 348/7 |
| 5,414,455 A | 5/1995 | Hooper et al. | 348/7 |
| 5,418,782 A * | 5/1995 | Wasilewski | 370/486 |
| 5,440,334 A | 8/1995 | Walters et al. | |
| 5,442,390 A * | 8/1995 | Hooper et al. | 725/90 |
| 5,446,735 A * | 8/1995 | Tobagi et al. | 370/445 |
| 5,453,779 A | 9/1995 | Dan et al. | |
| 5,461,415 A | 10/1995 | Wolf et al. | |
| 5,512,934 A | 4/1996 | Kochanski | |
| 5,512,936 A * | 4/1996 | Burton et al. | 725/120 |
| 5,533,018 A * | 7/1996 | DeJager et al. | 370/352 |
| 5,541,917 A * | 7/1996 | Farris | 370/353 |

(List continued on next page.)

FOREIGN PATENT DOCUMENTS

| | | | |
|---|---|---|---|
| EP | WO94/14273 | 6/1994 | ........... H04M/11/08 |
| WO | WO96/37983 | 11/1996 | |

*Primary Examiner*—Vivek Srivastava
*Assistant Examiner*—Hai V. Tran
(74) *Attorney, Agent, or Firm*—Blakely, Sokoloff, Taylor & Zafman LLP

(57) ABSTRACT

An architecture for distributing digital information to subscriber units wherein selection from among multiple digital services is accomplished by transmitting a tuning command from a subscriber unit to an intermediate interface. The intermediate interface selects the desired service from a broadband network and transmits it to the subscriber unit over a bandwidth-constrained access line. The bandwidth-constrained access line may be implemented with existing infrastructure, yet the subscriber unit may access a wide variety of digital information available on the broadband network. Universal broadband access is thus provided at low cost.

8 Claims, 7 Drawing Sheets

U.S. PATENT DOCUMENTS

| | | | |
|---|---|---|---|
| 5,544,161 A | * 8/1996 | Bigham et al. | 370/397 |
| 5,550,577 A | * 8/1996 | Verbiest et al. | 725/92 |
| 5,557,317 A | * 9/1996 | Nishio et al. | 725/92 |
| 5,561,456 A | 10/1996 | Yu | |
| 5,583,561 A | * 12/1996 | Baker et al. | 725/93 |
| 5,583,863 A | * 12/1996 | Darr, Jr. et al. | 370/397 |
| 5,583,864 A | * 12/1996 | Lightfoot et al. | 370/396 |
| 5,594,491 A | * 1/1997 | Hodge et al. | 725/103 |
| 5,600,364 A | 2/1997 | Hendricks et al. | |
| 5,603,058 A | * 2/1997 | Belknap et al. | 710/35 |
| 5,631,694 A | 5/1997 | Aggarwal et al. | |
| 5,748,493 A | 5/1998 | Lightfoot et al. | |
| 5,793,410 A | * 8/1998 | Rao | 725/120 |
| 5,940,738 A | 8/1999 | Rao | |

* cited by examiner

VIDEO PEDESTAL NETWORK

This is a Division of application Ser. No. 08/451,264 filed May 26, 1995 now U.S. Pat. No. 5,793,410, the disclosure of which is incorporated by reference.

BACKGROUND OF THE INVENTION

The present invention relates generally to delivery of digital information to subscriber premises and more particularly to providing this access without substantial new wiring expense.

The delivery of digital video services to the home represents one important aspect of the much publicized "information highway." These services include HDTV, video-on-demand (VOD), near-video-on-demand (NVOD) providing staggered program starting times, interactive video services (IVS), and other digital variants of conventional broadcast services.

One of the main obstacles to the introduction of these services is development of the necessary infrastructure for delivering digital video information to the subscriber' premises. Video services, even with the use of modern compression standards such as MPEG-1 and MPEG-2, intrinsically require large bandwidths. Somehow an infrastructure must be constructed to distribute the necessary signals to individual subscriber premises. At a minimum, each subscriber should be able to select from among numerous digital video programs as can be done now with analog broadcast television.

Various solutions have been proposed. In one scheme, the digital data are distributed via an asynchronous transfer mode (ATM) network to each subscriber's premises. The physical medium of the ATM network may be implemented in more than one way. One way is to lay optical fiber to each home. Alternatively, fiber may be laid up to the curb, from which point a coaxial cable can relay the ATM cells. The advantages of this technique are the low latency and flexibility of the ATM technology and a large bidirectional bandwidth sufficient to distribute numerous interactive digital video programs. Nonetheless, this approach is practically infeasible today since the cost of laying fiber or coaxial cable to each home is prohibitive. Additionally, the time required to deploy such an infrastructure over a large geographic area makes the scheme even more unattractive.

An alternative scheme is the so-called hybrid fiber coax (HFC) scheme. The HFC scheme provides a two-level network. At the higher level, optical fibers are used to distribute digital information to a plurality of Cable Headends or Host Digital Terminals (HDT). Each Headend or HDT in turn distributes information to multiple hybrid fiber coaxial cables, each of which serves several hundred subscriber units in a bus/loop architecture. The return channel over the coaxial cable is also shared by multiple subscriber units by employing Time Division Multiplexing (TDM). Again, for those network providers that do not already have such an infrastructure installed, costs are prohibitive because coaxial cable must be brought to each home. Furthermore, the use of TDM coupled with highly limited bandwidth gives rise to a large latency in the return channel. Network security is another drawback of the HFC architecture as several users share a single coaxial cable, a particular concern for interactive services that may require transmission of a subscriber's private information.

Other schemes take advantage of the existing telephone network by using ADSL technology to transfer high data rate information, such as video, over existing telephone company twisted pair lines to subscriber premises. Optical fiber may be used to transfer digital information to the telephone company central office or to a curbside interface where the twisted pair lines begin. The latter architecture is commonly referred to as Fiber-To-The-Curb (FTTC). Alternatively, fiber may be deployed till the basement of a large building, from which point existing twisted pair lines can establish connection with each subscriber. Such an architecture is commonly referred to as Fiber-To-The-Building (FTTB). The disadvantage of this approach is that ADSL provides insufficient bandwidth. Most current ADSL trials carry only 1.5 or 2 Mb/s over twisted pair. Laboratory demonstrations have shown that in the next few years cost effective solutions that provide up to 25 Mb/s may be possible, but even this would be insufficient to provide a broadcast or NVOD service with an acceptable number of service selections. Approaches which bring fiber to the curb carry the added cost of laying the fiber.

Prior art digital data delivery schemes that use relatively narrow bandwidth connections to the subscriber premises require point-to-point sessions between the ultimate server and subscriber unit. This is because the narrow bandwidth link that is closest to the subscriber permits only a point-to-point connection if the desired service quality is expected to be reasonable. These point-to-point sessions waste bandwidth since the server must separately transmit to multiple subscriber units requesting the same program. If the user wishes to switch channels, there is significant extra latency resulting from the need to end the previous point-to-point session before beginning a new one. Furthermore, the network and server hardware needed to accommodate point-to-point sessions is particularly complex and expensive.

SUMMARY OF THE INVENTION

The invention provides a network architecture for distributing digital data to subscriber units wherein selection from among multiple digital services is accomplished by transmitting a tuning command from a subscriber unit to one or more intermediate interfaces in a series of links interconnecting the subscriber unit and a server. An example of such digital data is digital video and the services could be multiple digital video programs. The network architecture of the present invention is capable of providing public broadband access without the use of very high bandwidth access lines to subscriber premises.

Using the information received from the subscriber unit, the intermediate interface selects the desired digital service from a multitude of services available in a broadband link coupled to the interface's input and transmits it to the subscriber unit over a bandwidth-constrained link. The bandwidth-constrained link may be implemented with existing infrastructure, yet the subscriber unit may readily access a wide variety of digital services available on the broadband network. The present invention thus combines universal broadband access with low cost.

In accordance with the invention, a service provider may offer broadcast services over the network in addition to point-to-point interactive services. The broadcast services may be offered without requiring multiple point-to-point sessions from the server to each requesting subscriber unit. Instead, a single copy of a digital stream provided via the broadband link is sufficient to service multiple subscriber units which request it via their intermediate interfaces, thus conserving bandwidth. By contrast, in the prior art point-to-point schemes, the broadband network would be forced to carry a separate point-to-point connection for each requesting subscriber unit.

Note that the present invention provides the advantages of forgoing point-to-point connections for broadcast purposes without requiring the construction of the very high bandwidth links necessary to continuously transmit each available program to each subscriber unit. Thus digital broadcast and NVOD services may be provided effectively and at low cost.

In accordance with one aspect of the present invention, a conventional telephone network is enhanced to provide universal high bandwidth digital service. Typically, telephone service is provided to subscriber premises via individual access lines extending from the subscriber premises to a neighborhood hub or pedestal. The access lines are private and secure twisted pair lines. The pedestal is fed by a high data-rate trunk line, typically implemented as a fiber optic connection.

High bandwidth digital service, including video programming, is transmitted over a twisted pair connection by implementing Asymmetric Digital Subscriber Link (ADSL) modulation and demodulation over the connection which allows for transmission of high speed digital data in a manner that is transparent to existing telephonic traffic, as is well known to those of skill in the art. The network equipment for ADSL modulation and demodulation typically resides in the pedestal.

In accordance with this aspect of the present invention, the pedestal is further specially adapted to receive tuning information from a subscriber unit to which it is coupled by an access line. The pedestal uses the tuning information to select the specified digital data from the multitude of service data received over the broadband network at its inputs to be relayed to the subscriber unit.

In accordance with the present invention, this architecture could be further extended by including one or more additional interfaces. For example, in addition to the pedestal, an interface could be provided within the telephone company central office. The overall video distribution scheme would then incorporate three interconnected layers. The lowest layer would constitute the individual narrow bandwidth access lines between the pedestals and subscriber premises, the middle layer would constitute an intermediate bandwidth link between the central office and the pedestal, and the top layer would be a broadband network feeding the central office or some other broadband source, e.g., a satellite feed. With this scheme, the tuning function could be shared between the pedestal and the interface within the central office. The pedestal would respond to a tuning command from a subscriber unit by attempting to extract the desired program from the intermediate bandwidth network. If the desired program is not already available via the intermediate bandwidth link, the pedestal signals the central office interface to retrieve the program from the broadband network. Of course, this multilayer architecture could be extended indefinitely over any number of interfaces and layers.

The capacity of the intermediate bandwidth link would limit the number of different choices that could be selected simultaneously by subscribers serviced by the same pedestal. For example, the intermediate bandwidth link could carry a fixed number of NVOD channels with each subscriber able to choose one for current viewing. However, not all of the NVOD channels available via the intermediate bandwidth link are likely to be viewed simultaneously. In accordance with the invention, additional digital services may opportunistically exploit intermediate link capacity left unused by current subscriber activity. These additional services could include other broadcast and NVOD channels, VOD service, or interactive services.

In accordance with the present invention, this opportunistic bandwidth scheme could also be adapted to operate in the context of a loop or bus architected access line network, such as a hybrid fiber/coaxial (HFC) network, providing digital broadcast, NVOD or other interactive services. In a HFC network a Host Digital Terminal (HDT) or Cable Headend couples a broadband optical network to one or more HFC cables each of which serves multiple subscriber units in a loop/bus architecture. The HDT or Cable Headend can be modified in accordance with the invention to incorporate an interface that passes only that digital service that has been requested by a subscriber unit as opposed to the prior art method of carrying all the streams belonging to a broadcast or NVOD offering. If bandwidth remains on the cable, additional services can opportunistically exploit it.

Numerous other combinations of layers and interfaces are possible within the scope of the present invention. For example, the broadband network may be implemented as one or more satellite or MMDS (Multichannel Microwave Distribution System) feeds. A video distribution system in accordance with the present invention may also be easily extended to provide interactive services. Alternatively, information besides video information could be distributed. For example, interactive internet services may be provided over the same network that incorporates the present invention.

The invention will be better understood by reference to the following detailed description in connection with the accompanying drawings.

DESCRIPTION OF THE SPECIFIC EMBODIMENT

Figure 1:
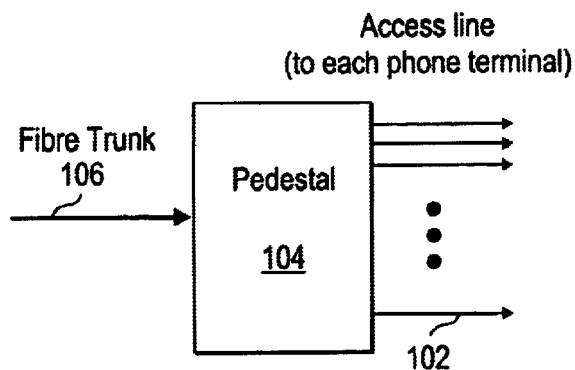
FIG. 1 depicts a typical pedestal-based telephone network.

The present invention provides a system for distributing digital information from a broadband digital information source to one or more subscriber units. An exemplary digital information distribution system in accordance with the present invention includes a plurality of digital information servers coupled to a plurality of Subscriber Terminal Units (STUs) or subscriber units via a plurality of links.

A link provides a mechanism for transferring data from one entity, called the source, to another entity, called the receiver. A link is capable of transferring data in either direction or both directions simultaneously. An entity that is a receiver for data travelling along one direction in a link can be the source for data travelling along the opposite direction in the same link. Likewise, an entity that is a receiver for one link can be a source for another link. For example, if data passes down one link into a receiver and continues into another link, the same entity that was the receiver for the first link becomes the source for the second link.

Multiple receivers may be coupled to a common source via the same link. Similarly, multiple sources may be coupled to a common receiver via the same link. An example of these two implementations is a bus or loop architecture. In another architecture, commonly referred to as the star architecture, one link couples only one receiver to one source (of course each entity can be either the receiver or the source or even both at one time since data may travel bi-directionally).

Digital data travels from the information servers, which in this context constitute the broadband digital information source, to the STUs via two or more links and possibly via one or more receivers/sources between the links. All receivers/sources through which data travels before reaching the STU may be referred to as intermediate interfaces or simply interfaces.

The digital data provided by the information servers may be in the form of text, graphics, audio or sound, video or still image, or binary computer data. It should be noted that the STU can be viewed as a receiver or source as well these terms have been used in the discussion above. The function of the STU or the subscriber unit is to receive the desired data from the network and convert it to a form useable by the subscriber, e.g., a video stream may be displayed on a conventional television screen, or a text stream may be printed on paper. The information servers may be general purpose media servers, video servers, real-time audio and video encoders, or any other device from which digital data may be extracted.

Links may be implemented in a variety of physical media without restriction. For example, a link may be a satellite channel, an optical fiber channel, a coaxial cable, a telephone twisted pair, or a microwave channel.

In accordance with the invention, the subscriber unit may select a particular stream of digital information to be received from many streams of digital information available from a source even if the available streams would not together fit within the bandwidth of the link connected to the subscriber unit. This is done by shifting the selection or tuning function away from the subscriber unit to one or more interfaces between the links or between a link and the source. The tuning function is directly controlled by the subscriber unit.

The subscriber unit sends a message to a particular interface selecting a desired stream of digital information. The interface responds to the message by selecting the desired stream from a multitude of streams received at that interface from the source and relaying that stream toward the subscriber unit via one or more links. In a system with multiple links and interfaces between them, the interface to which the message is directed may not itself currently have the desired digital information stream available to it. Such an interface would respond by requesting the desired stream from another interface closer to the broadband source. The tuning function could be distributed over many interfaces in this way.

The digital information distribution system of the present invention will be made clearer with reference to a particular example, the modification of a conventional public telephone network to distribute digital video services such as digital broadcasting of standard definition and High Definition TeleVision (HDTV) programs, video-on-demand (VOD), near-video-on-demand (NVOD) providing staggered program starting times, interactive video services (IVS), and internet services.

FIG. 1 depicts a typical pedestal-based telephone network 100. Telephone network 100 includes a series of access lines 102 connected to individual telephone terminals, a hub or pedestal 104, and a fiber trunk 106 to connect the pedestal to the central office. It should be noted that the pedestal may in fact be within the Central Office itself, i.e., it is not a remote unit. In such a situation, fiber trunk 106 is the core telephone network. If the pedestals are remote units, the connection between the Central Office and the pedestals, fiber trunk 106, could either have a star topology, or it could have a bus/loop topology. Access lines 102 provide the individual customer terminals with private and secure connections to the network. Fiber trunk 106 typically carries data at OC1/DS3 (approximately 45 Mb/s) or OC3 (approximately 155 Mb/s) rates, typically over an optical link.

Access lines 102 are typically copper twisted pair lines having a maximum length less than a mile. The function of pedestal 104 in the downstream direction is to demultiplex telephone data received from fiber trunk 106 and route it to appropriate terminals in customer premises. For upstream operation, pedestal 104 aggregates incoming data received via access lines 102, multiplexes it and sends it over trunk 106.

In accordance with one embodiment of the present invention, pedestal 104 is modified so that digital video and other digital services are provided without laying of new access lines. A telephone network so-modified is herein referred to as a "Video Pedestal Network" or "VPN". A pedestal so-modified is referred to as a "Video Pedestal" or "VP".

In an exemplary VPN, MPEG-2 data is delivered to the pedestal at a very high rate (e.g., OC3 or higher). Data is carried to subscriber premises via the copper line using Asymmetric Digital Subscriber Link (ADSL) technology as known to those of skill in the art. However, since the bandwidth of the copper line is much less than that of the fiber, not all the incoming data can be transmitted over the copper line. This bandwidth mismatch is resolved by requiring the pedestal to filter out all MPEG-2 packets that are irrelevant to the program selected by a subscriber unit which is itself connected to the copper access line. In other words, the pedestal sends out over each copper line only those MPEG-2 packets that are necessary to enable reception of the selected program channel. The subscriber unit receives only a single program MPEG-2 transport stream (or alteratively, a very small set of MPEG-2 transport streams) at its input.

From the above it is clear that the pedestal must somehow know which packets in the incoming stream are to go down through each access line. In accordance with the invention, each subscriber unit tells the VP as to which MPEG-2 packets it wishes to receive. This is accomplished through a special signaling protocol between the subscriber unit and the VP. The VP generally does not need to know anything about the content of either the incoming or outgoing MPEG-2 stream. It receives information from each subscriber unit as to which packets that subscriber unit wishes to receive and merely filters those packets down through the access line. As a result, the VP architecture is kept very simple. In essence, a part of the channel tuning functionality has been shifted from the subscriber unit, where it would reside for a conventional cable television system or prior art digital VOD and NVOD systems, to the network.

The shifting of tuning intelligence into the VP gives the VPN significant advantages over the so-called FTTCO (Fiber-to-the-Central Office), FTTB and other similar schemes of the prior art, wherein the subscriber unit selects from among digital video data transmitted over the twisted pair line via ADSL. In FTTCO, FTTB and other similar schemes, the subscriber unit only "sees" a small amount of MPEG-2 data, equal to whatever can be transmitted over the copper line from an optical network unit (which couples the fiber to the low bandwidth access line). Since FTTCO, FTTB and other similar schemes in their current implementation do not perform any tuning in the network, their capabilities are limited to point-to-point services. In contrast, the VPN presents the subscriber unit with a virtual connection to the core network (fiber trunk), thus enabling it to receive substantially more services, such as broadcast and NVOD, than would be available with FTTCO.

It is stressed that the broadcast and NVOD services are in addition to whatever services existing FTTC, FTTB and other existing similar schemes provide. This is because the VPN can be architected to have the same switching capabilities as these prior art networks for providing point-to-point connections.

VPN has several advantages over the HFC network architecture as well. While it is true that HFC supports broadcast and NVOD services readily, it does not effectively support point-to-point interactive services. This is due to extremely low bandwidths available for the return channel. The VPN does not suffer from such a disadvantage since it is based on a star topology. Security is also superior in the VPN. Once again, since the VPN uses a star topology for the access part of the network, each customer has a private connection to the network. This is in contrast to the HFC architecture, where each coax is shared by several hundred users in a loop architecture. As a consequence there is much more security and privacy in the VPN.

Note that in the VPN architecture the ADSL latency also adds to the channel acquisition time since part of the tuning is performed in the VP. However, the extra few tens of milliseconds does not represent a significant impact on the typical 500 milliseconds or higher number that subscriber units typically require for locking onto a new video channel.

Because VPN as described with reference to FIG. 1 does not require laying of new cables or wires to every individual subscriber's premises, it is possible to launch digital broadcast and NVOD services on a large scale relatively quickly—much more quickly than for distribution systems such as FTTCO, FTTC and FTTB. The important modifications to the telephone network to implement the VPN are in the pedestals.

A very significant advantage of the VPN, however, is that it seamlessly evolves to a completely interactive network once service offerings mature. By ensuring that the signaling protocol between the subscriber unit and the VPN is very general it is possible to support all the interactive services right from the beginning. This service evolution feature, combined with the relatively insignificant cost of network construction, makes the VPN architecture of the present invention extremely attractive.

The architecture of the subscriber unit that connects to the VP Network is no different from that of subscriber units of the prior art, except, of course, for the support required for the tuning signaling protocol between the subscriber unit and the network. As in the case of any other network, the subscriber unit connected to the VPN has a network interface module appropriate to the characteristics of the access line connecting the subscriber unit to the network, e.g., an ADSL network interface module will be required for a twisted pair copper access line.

Figure 2:
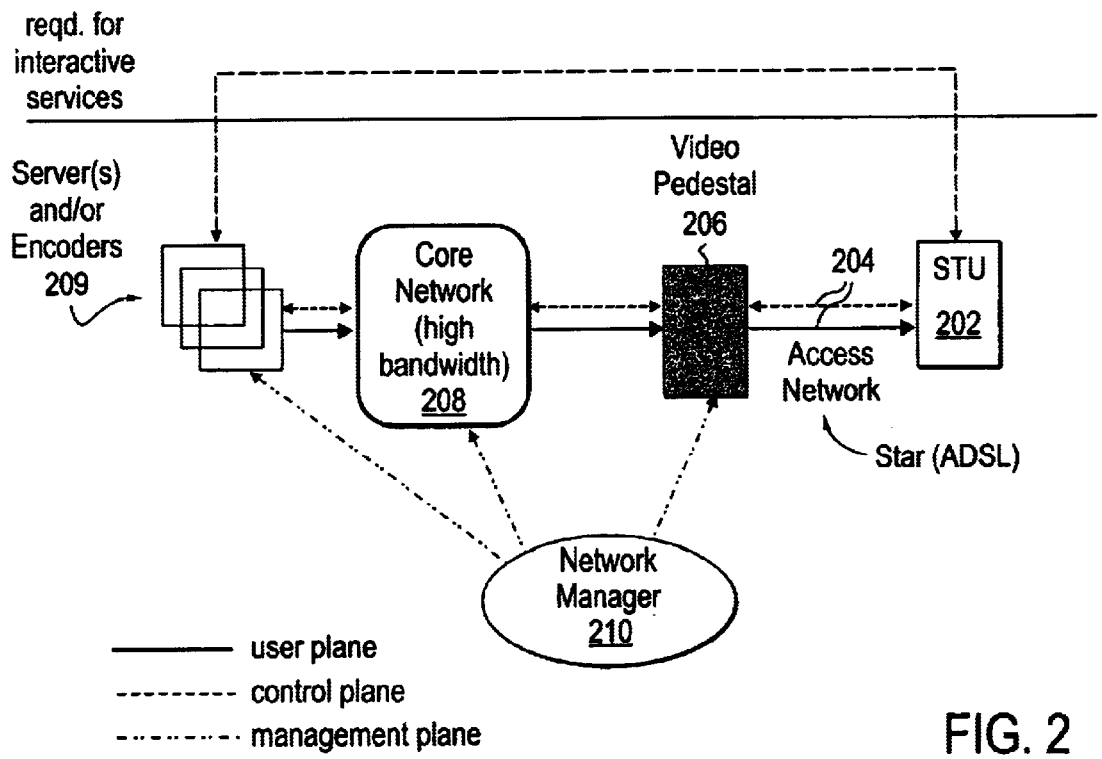
FIG. 2 depicts a top-level diagram of a video pedestal network in accordance with one embodiment of the present invention.

FIG. 2 depicts a top-level diagram of a VPN 200 of one embodiment of the present invention. VPN 200 includes a representative subscriber unit 202, an ADSL access network 204 having a star topology, a VP 206, a high bandwidth core network 208, a series of servers and/or encoders 209, and a network manager 210.

VP 206 interfaces core network 208 with access network 204. Core network 208 is a high bandwidth digital network, or series of networks, that interfaces with the content servers 209. Core network 208 could be based on fiber, satellite, or microwave, or any combination of these technologies. Access network 204 is the final segment of the delivery system. To save cost access network 204 is preferably implemented on existing medium such as telephone wires (copper twisted pair). Of course, it is not a requirement for the present invention that the access lines be copper twisted pair. For example, if no existing access lines are available as would be the case if the network provider is an entity other than a telephone company, any other physical medium that is appropriate to the needs and constraints of the network provider may be used, e.g., coaxial cable. Subscriber unit 202 interfaces with access network 204 through a network interface module (not shown).

As described above VP 206 interfaces access network 204 with core network 208. In essence, VP 206 shields subscriber unit 202 from the core network architecture, thus making it possible to use the same subscriber unit with different core delivery systems (satellite, fiber, microwave). Of course, the part of VP 206 that interfaces with core network 208 will be dependent on the characteristics of the latter. The VP also has an interface with network manager 210 for purposes of control and monitoring.

The input to VP 206 is preferably a high bandwidth MPEG-2 stream appropriately adapted to the physical medium of core network 208. For example, if core network 208 is built using optical fiber, MPEG-2 data could be carried over ATM cells using AAL5 as known to those of skill in the art. Alternatively, if core network 208 is a satellite channel, MPEG-2 data would typically be directly modulated using Quadrature Phase Shift Keying (QPSK), again as known to those of skill in the art. Any physical layer could be used to implement core network 208 in accordance with the present invention.

VP 206 has multiple physical outputs, each of which is a twisted pair telephone line. First consider the case where only one program is required to be sent down over each twisted pair connection. Current ADSL technology limits the bandwidth of each telephone line to approximately 6–8 Mb/s, which is much narrower than the bandwidth of the core network.

The principal function of VP 206 is to receive from each subscriber unit information as to which one program that subscriber unit wishes to decode, filter from the input stream the appropriate MPEG-2 packets corresponding to that program, and transmit them to the subscriber unit. The process of filtering MPEG-2 packets and transmitting them over the access network is performed without violating any MPEG-2 requirements, and without introducing significant jitter in the MPEG-2 packets.

Figure 3:
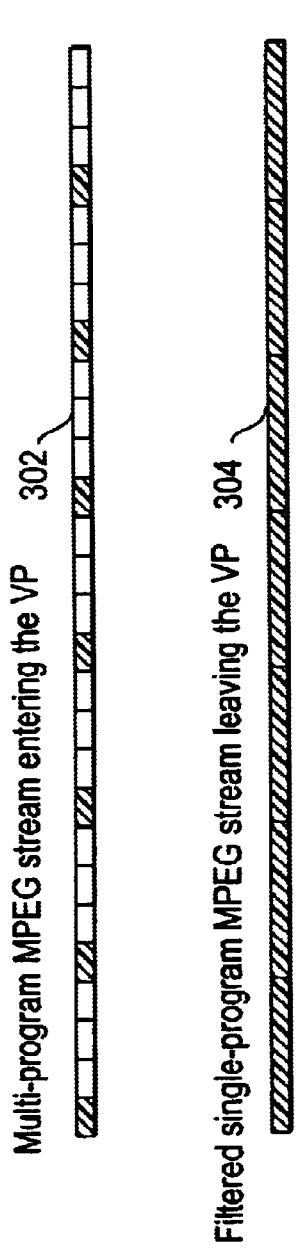
FIG. 3 depicts how a desired program may be filtered from a multi-program stream in accordance with one embodiment of the present invention.

FIG. 3 depicts how a desired program may be filtered from a multi-program stream in accordance with the invention. The top portion of FIG. 3 depicts a high bandwidth MPEG-2 stream 302 coming into VP 206. This bitstream contains packets belonging to many different programs including a single program whose packets are denoted by slant-hatched lines. The bottom portion shows a stream 304 of filtered packets belonging to this single program leaving VP 206. The output rate is much lower than the input rate which results in "stretching" of the packets on the time line (since the packets in the input and output streams are all of the same size, i.e., 188 bytes as specified by MPEG-2). Note that the order of packets in the filtered program is not altered.

In reality, packets of disparate origin must be carried over the access line at the same time. For example, in one embodiment that is compliant with the European Digital Video Broadcasting (DVB) standard, both program data and Service Information (SI) (which carries the electronic program guide) data will typically be simultaneously delivered to the subscriber unit as known to those of skill in the art. Furthermore, with future advances in ADSL technology, it will become feasible to increase the capacity of the twisted pair medium to the point that it will become possible to support multiple video programs over a single telephone line. For example, with 25 Mb/s capacity it should be possible to carry 5 or 6 services. This can be used to serve multiple subscriber units within one home simultaneously over a single twisted pair access line. Alternatively, if the access line is implemented using a coaxial cable whose bandwidth is higher than that of twisted pair, it may be required to carry more than one service over this line in order to support multiple subscriber units in the home.

Figure 4:
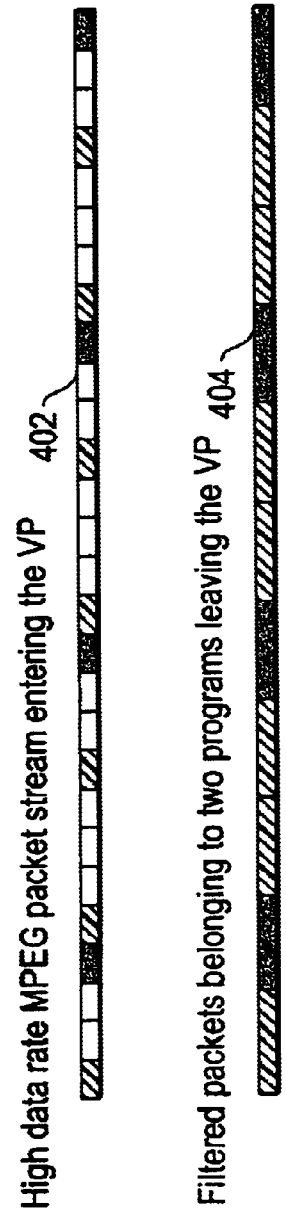
FIG. 4 depicts how two desired programs may be filtered from a multi-program stream in accordance with the invention.

FIG. 4 depicts filtering of MPEG-2 packets belonging to two different programs. The top portion of FIG. 4 depicts a high data rate MPEG-2 packet stream 402 entering VP 206. The bottom portion of FIG. 4 depicts a stream 404 carrying packets belonging to two different programs. In FIG. 4, one program (denoted by shaded packets) has a rate equal to one eighth of the total incoming rate, while the other program (denoted by slant-hatched packets) has a rate equal to one fourth of the total rate. These ratios are of course only examples. The outgoing dual-program rate equals the sum of the rates of the two filtered programs, i.e., it is $3/8$ times the incoming rate. The packets in the outgoing stream are in the same order as they were in the incoming stream. By ensuring that the outgoing rate is exactly equal to the sum of all the filtered program rates, it is possible to ensure that the received packet time stamp values in the subscriber unit are accurate.

Figure 5:
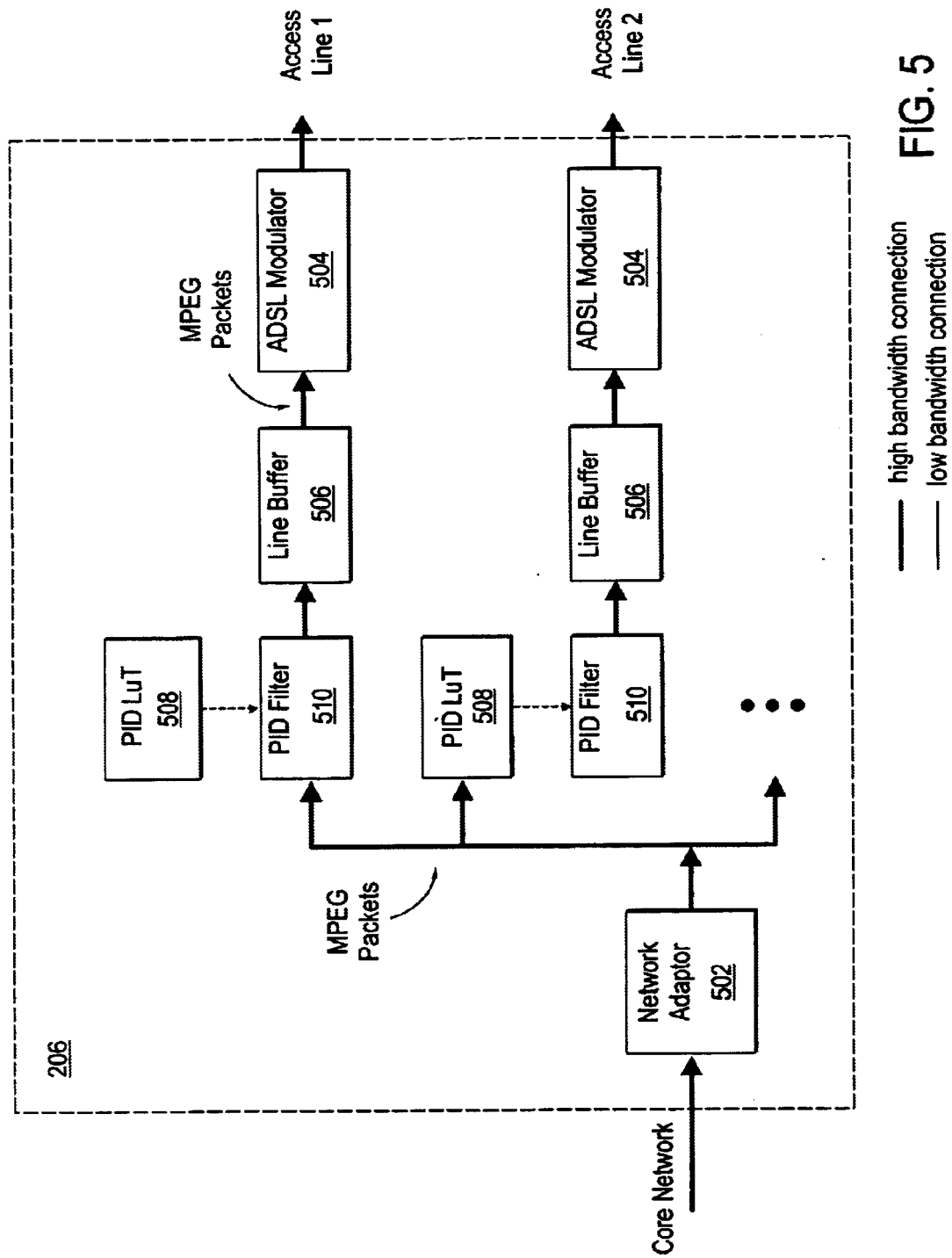
FIG. 5 depicts data flow to the subscriber within a video pedestal in accordance with one embodiment of the present invention.

FIG. 5 depicts data flow to the subscriber within VP 206 in accordance with one embodiment of the present invention. VP 206 includes a network adapter 502, and then for each access line, an ADSL modulator 504, and a line buffer 506. There is also an MPEG-2 Packet ID (PID) Lookup Table (PLUT) 508 and filter 510 for each outgoing access line. The concept of PID is well known to those of skill in the art. PLUT 508 contains a list of all PIDs that are to be transmitted over the access line and is constructed based on information received from the subscriber unit. Using PLUT 508, PID Filter 510 selects the appropriate PIDs from the multitude of PIDs contained in the entering stream and sends them to line buffer 506, which is a simple FIFO. Line buffer 506 is allowed to fill up until it is half-full before packets are removed. The rate at which buffer 506 is emptied equals the sum of the rates of all the programs being transmitted over the access line. For example, if 2 programs are filtered, with rates of 3 and 6 Mb/s respectively, line buffer 506 is emptied at a rate of 9 Mb/s. The access line data rate is preferably adjustable, in real time, up to its maximum value. If the access line data rate is fixed and greater than the rate of the outgoing MPEG-2 stream then it may be necessary to appropriately "pad" the outgoing stream with "null" or "dummy" packets to fill up the total available bandwidth.

A side benefit is that VP 206 can also be used as a "de-jittering" device, i.e., it can be used to eliminate any jitter introduced by core network 204. This eliminates the need for an extra buffer within the subscriber unit and also improves the timing recovery performance of the MPEG-2 decoder in the subscriber unit. The de-jittering is done in line buffer 506. Its size therefore depends on the extent of jitter in the incoming stream. If there is no jitter in the incoming bitstream, then this buffer need only be a few packets deep. However, if core network 204 does introduce jitter (e.g., if it is a switched ATM network), then the size of line buffer 506 can be set equal to twice the maximum jitter times the maximum rate on the access line. For example, assume that the core network can introduce a maximum delay of +/−2 milliseconds. If the maximum data rate on the ADSL access line is 20 Mb/s, line buffer 506 can be specified to have a size of 2*2(milliseconds)*20 (Mb/s)=80,000 bits.

This scheme assumes that VP 206 is aware of the data rate of the outgoing streams on each access line 204. This is ensured by having the subscriber units convey the stream rate to the VP, in addition to conveying the MPEG-2 PID information. The subscriber units themselves know the rates from the Program Specific Information (PSI) stream that is part of the MPEG-2 data stream, as will be easily understood by those of skill in the art. The "rate descriptor" in the PSI stream is specified by MPEG-2 to be an optional field. However, it is clear from the above statement that in this embodiment, the rate descriptor is mandatory in the PSI. In the case of MPEG-2 services that are of variable rate, the maximum possible rate of the service is carried in the rate descriptor field of the PSI. Such services are relayed by the VP to the subscriber unit at their maximum rate values.

To cover the most general case, the subscriber unit signals not only the PID and rate information to the VP, but also all other information that uniquely identifies the required stream in the core network. For example, in one embodiment that is compliant with the European Standard for Digital Video Broadcasting (DVB), certain fields in the Service Information (SI) data are available, such as "original_network_ID", "transport_stream_ID" and "service_ID" that uniquely identify a particular service stream in a multitude of data streams. In such a system, the subscriber unit could communicate all this information to the VP in order to uniquely identify the digital stream. PID Filter 510 in FIG. 5 would then be a more sophisticated filter since it must process all the additional identifier fields in addition to the MPEG-2 PID values.

The SI data stream is of course only one example of how program selection data could be distributed to subscriber units. Other protocols could be employed using the core and/or access networks. Alternatively, program selection data could be distributed via another medium such as floppy disk or CD-ROM.

There is however data that VP 206 cannot get from the subscriber units and must instead obtain from network manager 210. Alternatively, this data may be "hard-wired" into the VP if it can be ensured at start of deployment that the data will never or seldom change in the future. As an example, in a network following the DVB standard, this data includes the list of PIDs that comprise the SI data and the stream rate of the SI data. This information is required to enable VP 206 to provide the SI stream to any subscriber unit whenever the latter requests it.

The SI stream may be treated as simply another program and sent over the access line whenever any subscriber unit requests it. Alternatively, the SI stream may be transparently routed over all the access lines. This way, any change in the SI data is automatically available to the subscriber units. This also simplifies the architecture of VP 206 since it need not monitor and determine when the SI stream has been updated and therefore needs to be routed to the subscriber units. The disadvantage of this scheme is that some bandwidth over the access lines will always be consumed by the SI data. This is also however a drawback to the prior art video distribution schemes. The SI data may be structured so as to minimize bandwidth usage.

Network adaptor 502 recovers MPEG-2 packets from the core network delivery medium. For example, if core network 208 is based on ATM, network adaptor 502 would perform the appropriate ATM Segmentation and Re-assembly (SAR) functions. Alternatively, if the core network were a satellite channel, network adaptor 502 would include the appropriate channel decoder, e.g. a QPSK demodulator and Forward Error Correction (FEC) decoder.

As discussed above, VP 206 requires rate and MPEG-2 PID values for the filtered program from the subscriber units. This is accomplished by sending the information in the control plane via the return channel on the access line as will be understood by those of skill in the art. However, the same return channel may carry signaling data for a service provider further upstream than VP 206. For example, in a VOD application a subscriber unit may send a so-called VCR "trick mode" (pause/fast forward/etc.) command to the server. VP 206 recognizes which data in the upstream channel is addressed to it, and which is to be sent upstream. This function is accomplished within the signaling protocol used between VP 206 and the subscriber units.

Figure 6:
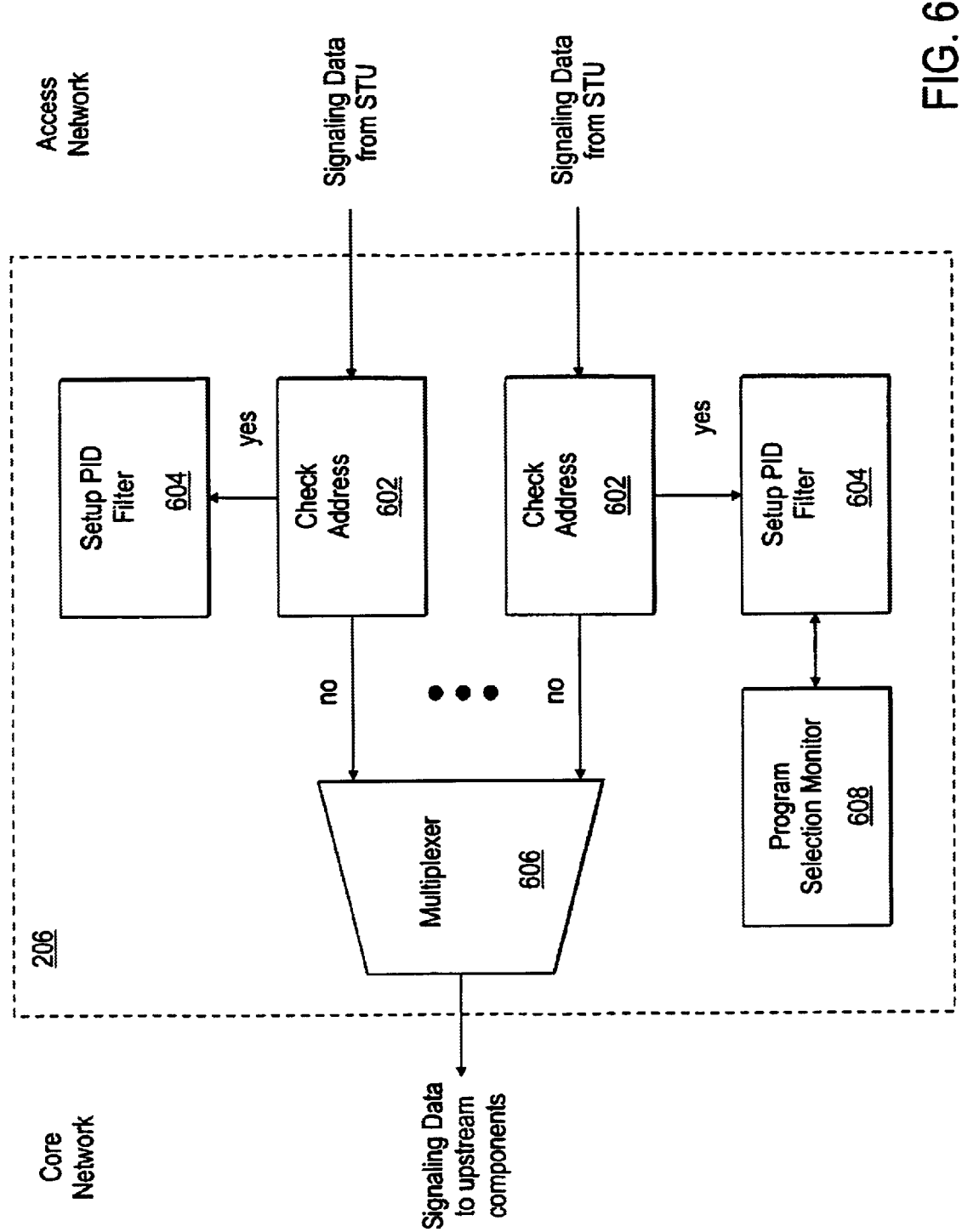
FIG. 6 depicts data flow from the subscriber within a video pedestal in accordance with one embodiment of the present invention.

FIG. 6 depicts return channel data flow within video pedestal 206 in accordance with one embodiment of the present invention. Each return channel within video pedestal 206 includes a check address block 602 coupled to a PID filter setup unit 604 that controls the contents of PID LUT 508. Return signal data intended for VP 206 is identified within check address block 602 and forwarded to setup unit 604 so that PID LUT 508 required for filtering of incoming MPEG-2 packets may be updated appropriately. Return signal data intended for upstream components is instead directed to an upstream multiplexer 606 that aggregates all the signaling packets to be sent upstream. A program selection monitor 608 is optionally provided to log subscriber selections for billing and/or survey purposes.

At power-up, subscriber unit 202 requests VP 206 to send SI data (if the SI data is always present on the access line, this step is omitted). Subscriber unit 202 then informs VP 206 as to which MPEG-2 PIDs to filter in order to receive a specific service.

It will be appreciated that numerous variations of and extensions to the basic VPN architecture are possible within the scope of the present invention. VPN implementation details will depend on a number of factors including settlement patterns and the nature of the existing infrastructure.

One simple variation is obtained by placing the VP at the telephone company Central Office (Co), instead of at a hub in each neighborhood. An advantage of this configuration is lower cost since core network 208 is now terminated at the CO. Access network 204 is still twisted pair based on ADSL, however, the average length of each access line is much longer, of the order of 2 or 3 miles. One disadvantage is that current ADSL technology severely limits bandwidth available on telephone cables of these lengths.

This configuration works very well in conjunction with so-called "scalable" ADSL modems as are envisioned. A scalable modem can operate over variable distances and support different bandwidths. For example, over a 2 or 3 mile distance, the supported bandwidth may be limited to 8 or 9 Mb/s; however, as the line length is dropped, the bandwidth increases. Thus, for example, at a distance of 3000 feet or less, the maximum bandwidth would be 25 Mb/s or higher with scalable modems.

The service can be started using the VP in the CO and with limited bandwidth to the subscriber unit. However, as services proliferate, the VP can be moved closer to subscriber premises thus increasing the available bandwidth, but without any modifications to the existing subscriber units themselves.

Another group of variations on the basic VPN architecture involves interfacing multiple core networks to VP 206. In one alternative embodiment, multiple OC3 (155 Mb/sec) or OC12 trunk lines (approximately 622 Mb/sec) are fed to the same VP 206. VP 206 is then configured to filter any program from any of these incoming feeds. With this type of configuration, VP 206 can potentially have more available bandwidth than an entire coaxial cable used in the HFC system.

Another similar configuration employs multiple satellite feeds to VP 206. This configuration is particularly useful in the context of apartment buildings with multiple satellite receiver antennas, each tuned to a different satellite. The sum total of all available transponder bandwidths could easily be of the order of 1000 Mb/s, with each satellite transponder carrying a bandwidth between 30 and 80 Mb/s.

In the multi-satellite feed case, VP 206 includes a network adaptor for each incoming transponder signal. There may be feeds from as many as, e.g., 50 different transponders each with an average bandwidth of 30 Mb/s. If it is desirable to limit the number of feeds coming into VP 206, the MPEG-2 streams from individual transponders can be combined within an MPEG-2 re-multiplexer prior to input to VP 206.

Figure 7:
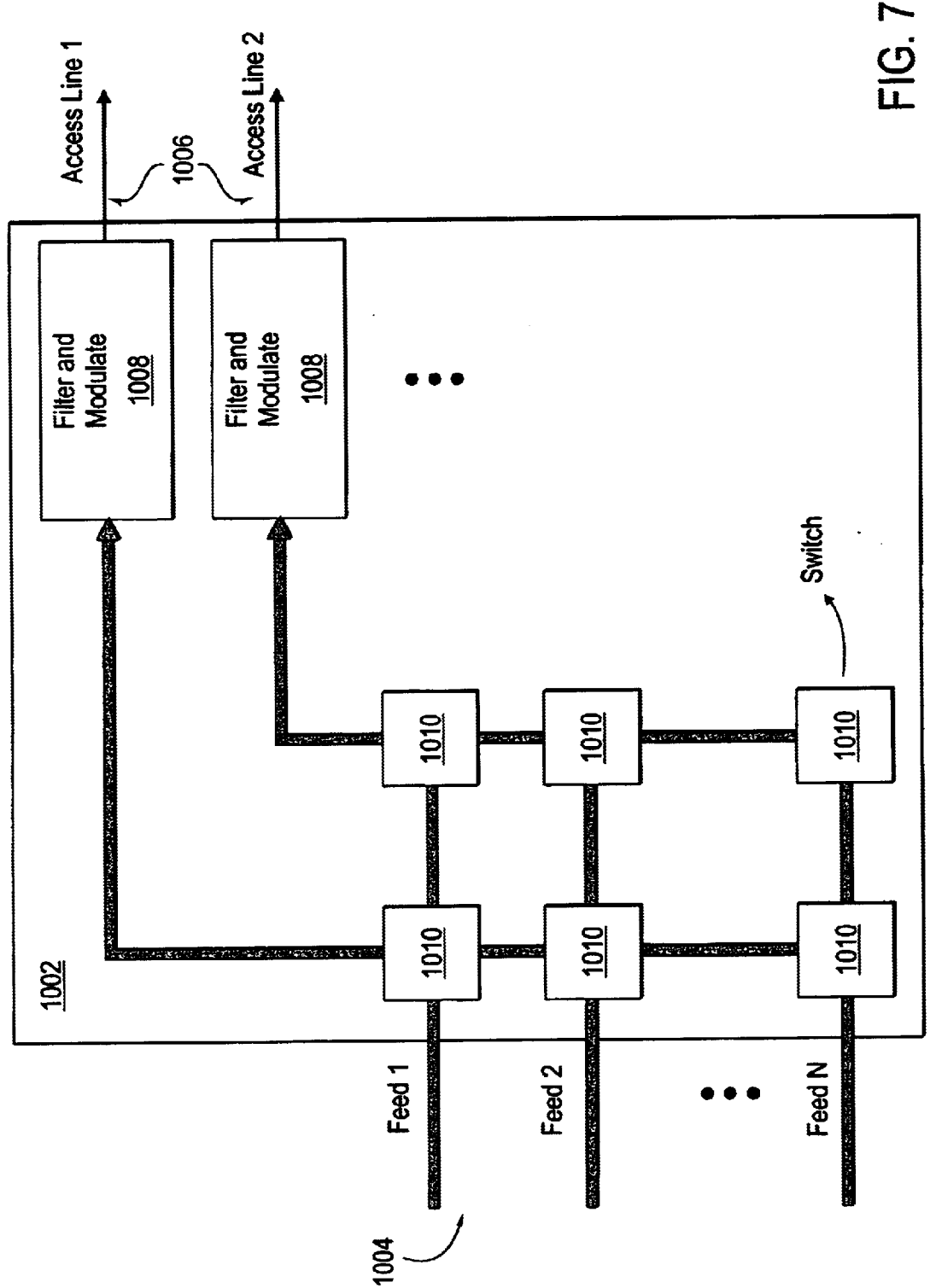
FIG. 7 depicts a multiple-feed video pedestal architecture based on a cross-bar switch in accordance with one embodiment of the present invention.

FIG. 7 depicts a multiple-feed VP architecture based on a cross-bar switch in accordance with one embodiment of the present invention. A multi-feed VP 702 is implemented using a simple crossbar switched connection. The inputs to multi-feed VP 702 are a set of input feeds 704 corresponding to, e.g., input trunk lines and/or satellite receiver outputs. The outputs of multi-feed VP 702 are a set of access lines 706. Each access line 706 receives its data from a filter/modulator 708 which performs the functions discussed in reference to FIG. 5. A series of switches 710 connects each input feed 704 to an access line 706. Only one of the switches 710 is on for any access line 706 at any time. The corresponding MPEG-2 stream is filtered and delivered to the output filter/modulator 708.

As previously described, the subscriber unit to VP signaling protocol is expanded accordingly to implement "feed-selection" in VP 702. The subscriber unit additionally informs VP 702 as to which input feed to connect to. It does this, for example in the context of a DVB compliant network, by providing VP 702 with the complete set of identification parameters for the required MPEG-2 stream ("original_network_ID", "transport_ID", and "service_ID"). The subscriber unit receives this information as a part of network information within the SI data as is known to those of skill in the art. VP 702 interprets this information to determine which input feed 704 to select for the specific subscriber unit. Again, as mentioned previously, the mapping between the information provided by the subscriber unit and the input feed may be static, i.e. hard-wired in VP 702, or it may be under the control of a network manager which can change it dynamically.

The basic concept of shifting tuning into the network in accordance with the present invention may be extended to implement a hierarchical VPN architecture, with multiple VP's regulating the flow of data through the network. Any component such as a VP or a subscriber unit may transmit a signal upstream, i.e., toward the broadband digital information source, to request a specific digital service from amongst the multitude of digital services that are available in the network. Of course, it is obvious from the discussion so far that all such components should have the ability to uniquely identify the digital stream they want to receive. In one embodiment such information is transmitted in the downstream direction, i.e., away from the broadband digital information source, by the server or other entity like network manager. Specifically, the SI stream in a DVB compliant architecture carries this information. Thus, all components that are desirous of selecting streams from a location upstream in the network should be capable of decoding and interpreting the SI stream.

In the simplest implementation, a signal requesting a specific digital service may be allowed to travel upstream along all available paths until it reaches the servers wherein it is terminated. All VPs traversed by the signal set their stream filters to pass the desired stream downstream. Of course, if any VP already has its filters appropriately set, it need not respond explicitly to the message.

One potential disadvantage of such an implementation is the possibility of "flooding" in the upstream channel since all signals are blindly broadcast along all available upstream paths. This problem is eliminated by building additional intelligence into the VPs as follows. Each VP determines if it is already passing the requested stream through to the output. If yes, it terminates the signal. If no, the VP sets its stream filters appropriately and then determines along which upstream path amongst its multiple input feeds should the signal be propagated and sends the signal along that path. Determination of the suitable upstream path is done by maintaining a list of identifiers for all streams that are available in each input feed and comparing this list with the stream identifier information in the received signal. For example, in a DVB compliant architecture, the list may contain the "original_network_ID's" of all the networks that are connected to a particular input feed. The "original_network_ID" of the requested stream is then matched with the appropriate input feed. In more complex networks additional information like "transport_ID" and "service_Id" may also be required to be matched.

The list of stream identifiers for each input feed may be hard-wired into the VP if it known before hand that they will not be altered. Alternatively, an external entity like a network manager may update the list dynamically.

Figure 8:
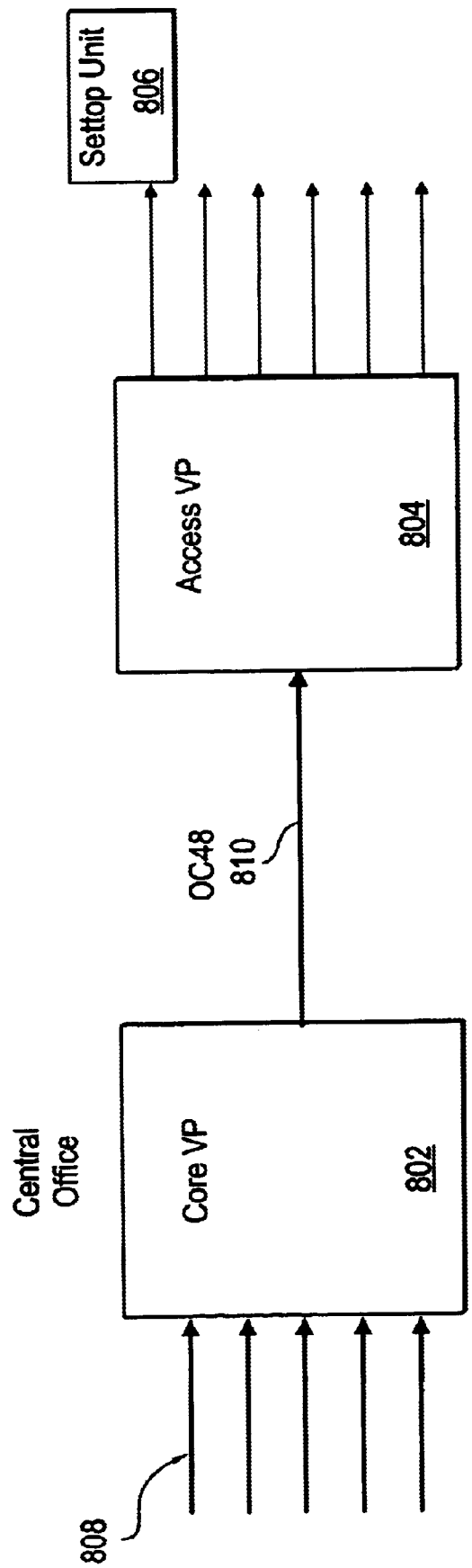
FIG. 8 depicts a two layer video pedestal network architecture in accordance with one embodiment of the present invention.

In accordance with the invention, bandwidth available within a hierarchical VPN may be opportunistically exploited by supplementary services, video or otherwise by employing "statistical multiplexing" as herein described. FIG. 8 depicts an exemplary two layer VPN 800 suitable for implementing statistical multiplexing in accordance with one embodiment of the present invention. VPN 800 includes a core VP 802, an access VP 804, a representative subscriber unit 806. Feeds 808 are the input to core VP 802. An OC48 line 810 interconnects core VP 802 and access VP 804.

Consider the use of VPN 800 to implement an NVOD service. For the purposes of this example it is assumed that OC48 line 810 can deliver approximately 480 channels of video programming. (The actual number of channels that can be delivered over any band-limited network is a function of the data rate allocated to each channel as well as the total capacity of the network.) This is sufficient for an NVOD service consisting of 20 movies, each of 2 hours duration, and with a stagger interval of 5 minutes. Any additional service would require more capacity on the connection between the core VP 802 and access VP 804.

Statistically speaking, it is improbable that every one of the 480 available channels will be viewed by some subscriber served by access VP 804 at all times. At any one moment, some of the channels would not have any subscriber tuned to them, and their bandwidth would essentially be wasted.

In accordance with the statistical multiplexing feature of the present invention, these channels could instead be used to provide additional services. For example, if a particular user did not want to watch any of the movies on the NVOD service, he/she could be offered some other service (e.g., interactive home shopping or VOD or even a program from another broadcast/NVOD service) on one of the NVOD channels not currently being viewed by anybody. These "opportunistic" services directly contribute to the revenue stream of the service provider.

Since the underlying model here is statistical, there will be occasions when situations arise so that statistical multiplexing could result in degradation of service quality. For example, consider the case when a user decides to take a break from watching a movie knowing that she/he can return to the same point in the movie by tuning to another channel which has the same movie delayed by the appropriate time. In the meantime, however, there is a possibility that particular channel was not transmitted since nobody wanted to watch it, and its slot in the network is occupied by an opportunistic service. In the worst case, all such "freed" NVOD slots could have been grabbed by opportunistic services with the result that this particular user would not be able to receive her/his movie at the end of her/his break.

Preferably, an appropriate scheduling and policing mechanism ameliorates this problem. In one embodiment, the VPN ensures that there is always a minimum number of free channels at any time and does not offer all the available channels to opportunistic services.

Referring again to FIG. 8, the network(s) to the left of core VP 802 carry very high bandwidth data. There may be one or more core networks feeding core VP. All the NVOD and other broadcast channels are available at the input to core VP 802. The SI data for the NVOD and broadcast service is always routed through to the subscriber units. Using the received SI data (which contains the Electronic Program Guide-EPG), each user selects a desired channel for viewing. As in the basic VPN architecture depicted in FIG. 3, the appropriate information regarding the selected channel (stream ID, rate and PID list, etc.) is signaled from the subscriber unit to access VP 804 to enable the latter to appropriately tune its filters and route the program through to the user.

In the absence of statistical multiplexing, this is all the signaling required between the subscriber unit and the network. Since all the broadcast and NVOD channels are available at the input of access VP 804, the latter appropriately sets its filters and subscriber unit 806 receives the selected program. However, when statistical multiplexing is employed, the requested program may or may not be available at the input to access VP 804. If it is available at the input to access VP 804 (which would be the case if some other user had already requested that program), then the access VP needs only set the filters appropriately and provide the requested program to the user.

However, if the program is not available at the input to access VP 804 (which would be the case if no other user had requested that program until that point, or if all the sessions with that program had been terminated (e.g., the movie had ended) and hence that channel had been offered to other opportunistic services), then access VP 804, in addition to setting its filters appropriately, also bounces the request to core VP 802. Core VP 802 then adjusts its filters to select the requested program and multiplexes it down the connection to access VP 804.

In one embodiment, for simplicity of implementation, the request is always bounced from access VP 804 to core VP 802, regardless of whether or not the program is already being filtered by the latter for transmission to access VP 804. This minimizes the complexity of the software in access VP 804, and reduces the latency in acquiring the channel. Of course, core VP 802 must then check if it needs to respond to the received signal. The general nature of this signaling protocol (i.e., when it is terminated and when it is propagated upstream) has been described above.

Core VP 802 maintains a list of which channels are currently being used and which are not. The list of channels not being used is the pool of available slots for the opportunistic services. These lists are dynamically maintained based on information received from the subscriber units.

Figure 9:
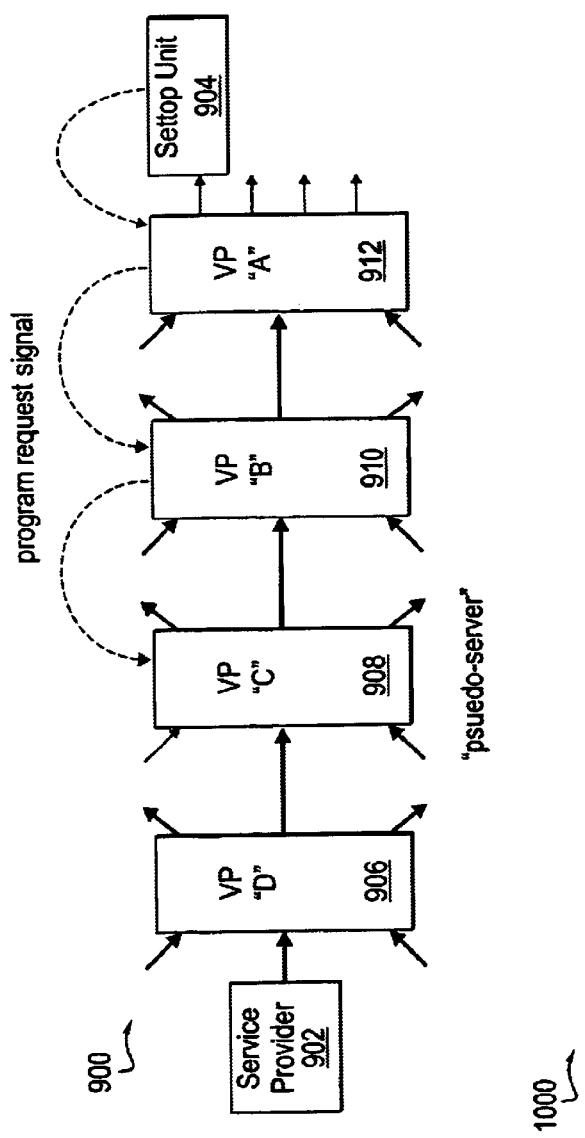
FIG. 9 depicts statistical multiplexing within a four layer video pedestal network in accordance with one embodiment of the present invention.

In an alternative embodiment, the concept of statistical multiplexing is generalized to a network with more than two layers of VPs. FIG. 9 depicts statistical multiplexing within a four layer VPN 900 in accordance with one embodiment of the present invention. VPN 900 includes a service provider 902, a subscriber unit 904 and four VPs 906, 908, 910, and 912 therebetween. Multiple input and output connections are shown for each VP.

In the configuration of FIG. 9, a request from subscriber unit 904 for a particular program bounces back sequentially from right to left until it reaches a VP which is already filtering the requested program through to its output. Each VP to the right of this VP, i.e., downstream from it, adjusts its filters appropriately and once this process is complete, the subscriber unit begins receiving the requested program.

Ultimately, the message may bounce from the subscriber unit all the way back to the server, which then initiates delivery of the program. This situation resembles VOD operation in some respects. However, once one subscriber unit has requested a program, another subscriber unit may be offered the same program downstream if it requests it. In VOD, the connection between the subscriber unit and the server is point-to-point and no other subscriber unit can take advantage of the delivery of the program through this connection.

The VPs in the network can be understood to be "pseudo-servers" for the NVOD services. When a user requests a program, the signal traverses upstream, i.e., toward the broadband digital information source, until it reaches the VP where the program is available. That VP then is the "pseudo-server" for that request. Note that the pseudo-server for the next request for the same program from another user could be a different VP, depending on the location of that user in the network. In the extreme case described in the previous paragraph, the pseudoserver is the actual server itself. The network designer must consider the effects of latency as the number of VPs increases in the chain.

Figure 10:
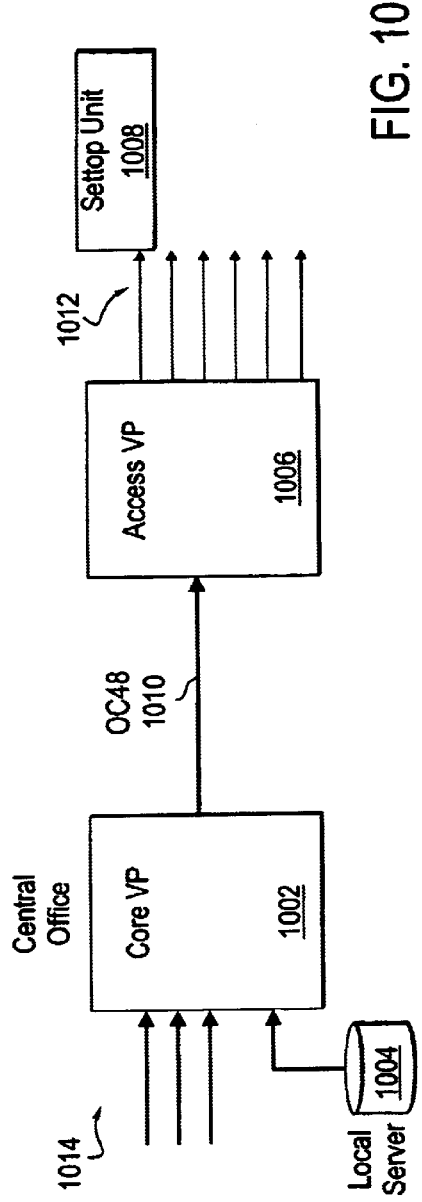
FIG. 10 depicts a video pedestal network wherein a video pedestal is adapted to incorporate input from a local server in accordance with one embodiment of the present invention.

In accordance with the invention, statistical multiplexing may be applied to introduce local programming at a neighborhood VP. FIG. 10 depicts a VPN 1000 wherein a core VP 1002 is adapted to incorporate input from a local server 1004 in accordance with one embodiment of the present invention. VPN 1000 includes core VP 1002, an access VP 1006, a representative subscriber unit 1008, an OC48 interconnection 1010 between core VP 1002 and access VP 1006, and access lines 1012 representing the outputs of access VP 1006. Core VP 1002 includes multiple feeds 1014 including a feed from a local server 1004. Server 1004 could be used, for example, to opportunistically inject programming and/or commercials relevant to a neighborhood or community. Any subscriber unit in the neighborhood can access this server.

In accordance with the invention, statistical multiplexing may also be applied in the context of a shared physical medium, e.g., a loop or bus architected access network such as an HFC network. This configuration is particularly useful to the operators of cable TV systems or others who already have such a network in place.

Every subscriber unit connected to the loop access network potentially has access to all the data being transmitted. Typically, encryption is used to protect data from unauthorized use.

The prior art scheme for providing NVOD services over HFC is to simply broadcast all the programming over the cable, consuming as much bandwidth as is required but limited, of course, by the total available bandwidth. Each subscriber unit can access all these programs, however it can decode only what it is authorized to. By introducing a VP at the headend (which is the source of all the services in the HFC cable), access to the data transmitted over the HFC is restricted to only those services that have been requested by the subscriber units. Services that have not been requested are not transmitted on the cable. In accordance with the invention, capacity left unused due to unrequested services can then be used for opportunistic services, including accessing programs from a local server in the headend.

In accordance with the present invention, standard HFC spectrum allocations may be modified to minimize latency when selecting programming. Typical HFC implementations allocate only a small portion of the spectrum (of the order of 25 MHz near the low end) for upstream signaling from the subscriber units. Due to the limited bandwidth here, which is shared between all the users, the signaling latency is typically very large, and would cause delays in selecting programming. In accordance with the invention, the upstream signaling bandwidth is increased to reduce this latency. Since statistical multiplexing increases the efficiency of the downstream allocation, the spectrum reallocated for upstream signaling does not have an appreciable impact.

In an alternative embodiment of the present invention, the VP in an HFC environment implements a logical star topology over the existing physical loop topology. Assuming that there are at least as many channels (herein a channel is defined as the minimum network capacity that is needed for delivering any one of the total available services) available on the cable as there are subscriber units connected to it, a specific channel is dedicated to each subscriber unit, and the subscriber unit tunes this channel to the appropriate service available at the VP in the headend. This architecture is structurally similar to the telephone network-based VPN discussed in reference to FIGS. 2–8.

As compared to the telephone network, however, the cable implementation has restricted capacity. In a telephone network VPN used for broadcast and/or NVOD, any number of subscriber units may be connected to a VP and offered services without any drop in quality as long as the trunk capacity feeding the VP is sufficient to carry all the programming. Of course, the size of the VP will increase with the number of users. However, for the logical star HFC architecture, once the number of subscriber units connected to the cable equals the cable capacity, i.e., the number of channels available over the cable, the network cannot add any more users, even with the same NVOD service offerings. The logical star HFC architecture, is thus most useful in the context of high bandwidth implementations which rely heavily on fiber optics for distribution.

So far the VPN has been described as containing VPs that perform filtering of MPEG-2 packets based on their unique identifier values (like PID, "service_ID", etc.). Those of skill in the art will appreciate that the present invention is not limited to performing filtering only at the "MPEG-2 layer". The concept of extending the tuning upstream into the network may be implemented in other ways as well. For example, in one embodiment in which the MPEG-2 packets are transported to the subscriber unit over ATM cells, the filtering of digital data in the pedestal may be performed by selecting the appropriate ATM cells. Since ATM cells are uniquely identifiable by their Virtual Path Identifier (VPI) and Virtual Connection Identifier (VCI) values, the VP merely selects the ATM cells with the appropriate VPI/VCI values from the incoming multitude of ATM cells.

In this case the subscriber unit has to signal the correct values of the VPI/VCI instead of MPEG-2 stream identifier values to the VP. Alternatively, the VP may have the intelligence to map the MPEG-2 stream identifiers values received from the subscriber unit to the correct VPI/VCI values.

In either case, the task is simplified if each MPEG-2 service has a unique VPI/VCI value associated with it. For example, in one embodiment which is a DVB compliant system, the Service Information data standardized by DVB is further extended to also include VPI/VCI values for each service. This information is received by the subscriber unit and conveyed to the VP.

If it is not possible to ensure that each MPEG-2 service has a unique VPI/VCI then the structure of the VP becomes more complex since it now has to monitor the MPEG-2 PID values buried inside the incoming ATM cells to determine which cells to relay to the subscriber unit. This may be even more complicated by the fact that MPEG-2 packets belonging to different services may be packed together inside the same ATM cell. The advantage of such an embodiment, of course, is that the entire MPEG-2 layer of the transport protocol is independent of the network architecture. For example, this makes the task of generating Service Information independent of network architecture.

Other embodiments that do not rely on MPEG-2 can also take advantage of this invention, as can be appreciated by those of skill in the art. Exemplary embodiments of the present invention include the appropriate network architecture with adequate signaling protocol support, as described above, a mechanism to uniquely identify each digital stream available from the source, and a mechanism to convey the stream identifier information to the entity that is desirous of selecting any specific stream from the network or the source. In the specific case of a DVB compliant MPEG-2 based system, the stream identifier information is carried in the SI stream and is made available to all entities that wish to select a specific digital stream from the network. A non-MPEG-2 system could use other means to convey the same information that is contained in the SI stream of a DVB system, for example, through a floppy disk.

While the above is a complete description of the preferred embodiments of the invention, various alternatives, modifications, and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. An interface between a satellite broadcast system and a plurality of subscriber units, said interface comprising:
   a plurality of access lines connecting said interface to individual ones of said plurality of subscriber units;
   a plurality of satellite broadcast receivers, each said receiver operative to demodulate a satellite broadcast signal and extract one or more MPEG transport streams;
   means for receiving messages from requesting ones of said subscriber units including identifiers identifying particular MPEG transport streams received by said plurality of receivers; and
   means for responding to said messages by filtering said particular MPEG transport streams from all MPEG transport streams received by said receiver and relaying said particular MPEG transport streams to requesting ones of said subscriber units.

2. The interface of claim 1, wherein said interface comprises means for responding to said message by filtering a single program MPEG transport stream from a multi-program MPEG transport stream received by said receiver.

3. A system for supplying desired digital information to a receiver comprising:
   a broadband digital information source;
   a series of two or more links between said broadband digital information source and said receiver, wherein digital information supplied from said broadband digital information source travels via each link in said series to said receiver, said digital information comprising MPEG packets; and
   an interface between at least one pair of adjoining links in said series,
   wherein said receiver sends a message to said interface selecting a desired MPEG transport stream of digital information, said message including identifier information specifying said desired stream and said interface responds to said message by selecting said desired MPEG transport stream from multiple streams of digital information already received at an input of said interface from said digital information source via one or more of said series of links and relaying said desired stream to said receiver via a remaining one or more of said series of links.

4. The system of claim 3 wherein said interface is further coupled to a further broadband digital information source via a further series of links, further streams of digital information being available from said further broadband digital information source for relaying to said receiver.

5. The system of claim 3 wherein said receiver receives from said interface a service information stream that includes identifiers of available MPEG transport streams, said identifiers being useable within said message to specify said desired MPEG transport stream.

6. The interface of claim 3, wherein said interface is coupled to said receiver via a twisted pair access line.

7. The interface of claim 3, wherein said interface is coupled to a plurality of receivers via a shared physical medium with a unique channel being reserved for communication with each receiver.

8. The system of claim 3, wherein said receiver sends a message to said interface selecting a desired single program MPEG transport stream and said interface responds to said message by selecting said desired single program MPEG transport stream from a received multi-program MPEG transport stream.

* * * * *